Oct. 11, 1938.  J. H. HAUSER  2,132,469
HORSE BIT
Filed May 13, 1937

Inventor
J. H. Hauser
By Egerton R. Case,
Atty.

Patented Oct. 11, 1938

2,132,469

UNITED STATES PATENT OFFICE 2,132,469

HORSE BIT

John Henry Hauser, Killam, Alberta, Canada

Application May 13, 1937, Serial No. 142,443
In Canada May 19, 1936

1 Claim. (Cl. 54—7)

This invention relates to improvements in horse bits, and the objects thereof are. (1) To prevent the bit pinching the sides of an animal's mouth, a defect common with the conventional style of horse bit; (2) to so form one of the members of the bit to prevent any movement of the bit-rings sufficient to cause the driving-lines or ropes to become twisted, and (3) to fixedly secure the tubular member of the bit and the cheek-plates together to remove from these elements any change of movement therebetween irritating the animal. The pinching of an animal's mouth by the conventional type of bit develops vicious habits in the animal, and when several horses are tied together, in case one throws up his head the mouths of the associated horses become pinched. By means of the improvement in question the shank of the bit will permit any animal moving its head without causing inconvenience to its fellows, and without any possibility of the driving lines becoming twisted.

In its broadest conception the bit consists of a tubular member, and a shank, the former containing the latter which extends therebeyond at each end thereof and is particularly shaped to carry the rings for the driving-lines. Cheek-plates are provided in fixed relation to the tubular member, one of which former is provided with a stop to positively limit turning movement of said shank, for the purpose stated.

Figure 1:
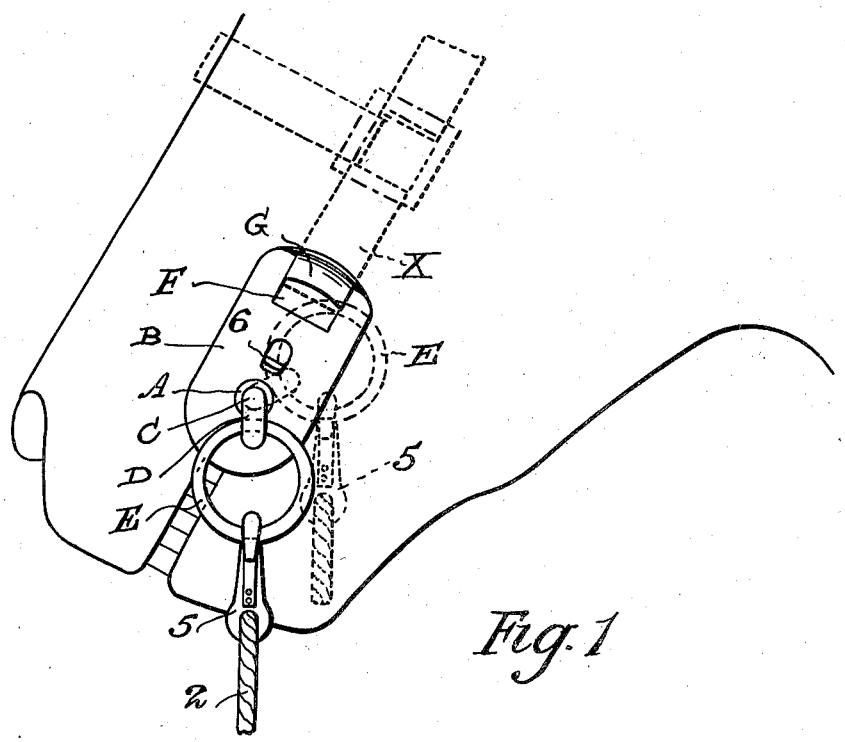
Figure 2:
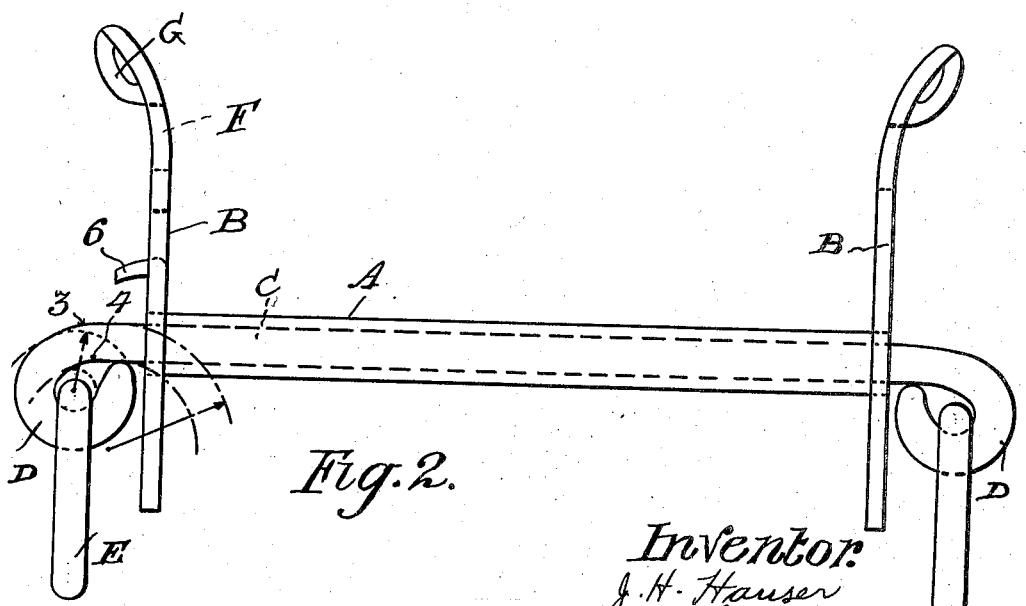

Fig. 1 is an end elevation of the horse bit showing the same in position for use, and Fig. 2 is a plan of the bit.

In the drawing, like characters of reference refer to the same parts.

A is the tubular member which lies within the mouth of the animal, and to each end thereof is fixedly attached a cheek-plate B. Within the member A, is located the shank C, the exterior shape of which conforms to the internal shape of the member A, and has sufficient clearance therewith to permit of free movement between these parts. The shank C, extends well (Fig. 2) beyond the cheek-plates B, and each end thereof is provided with a ring E, which ring is mounted in an eye D, formed at each end of said shank. The said rings are spaced well apart from the sides of the animal's mouth, and hence usual movement thereof will not cause any irritation.

Each cheek-plate B, is apertured at F, to receive the bridle-strap X, shown in dotted lines in Fig. 1, together with certain other parts of the bridle. This aperture in each plate is formed by cutting part of a plate and bending this cut part towards the upper end of each cheek-plate thus forming a relatively wide bar G, over which the said bridle-straps are passed.

The outer ends of the shank C, which carry the rings E are formed so as to provide increased leverage for these rings E, around this shank. To secure this increased leverage the inner portions of the exposed ends of the shank C, adjacent the cheek-plates B, are bent into substantially concentric segments 3, and 4, and the outer portions of said exposed ends are provided with eyes D. These eyes D, are formed eccentrically to said inner portions, and their arcs are formed from radii which make these arcs tangential to the arcs 3, and 4, as shown clearly in Fig. 2. This construction provides the maximum leverage since thereby I place the eyes D, well beyond the same side of the axis of the shank C. By reason of the weight of the rings E, eyes D, driving-lines or ropes 2, and the snap-hooks 5, this leverage is utilized to more or less prevent any movement of an animal's head sufficiently moving the shank C, on its axis to cause the driving-lines to become twisted. To twist these lines the shank C, must be turned on its axis completely, or substantially so. The turning of the shank as stated will not be positively prevented under all conditions since the habits of various types of animals vary very widely. Some much more violently toss their heads than others. However, the positive preventing of the turning of the shank C, on its axis is secured through the use of a stop carried by either one of the cheek-plates B. This stop I prefer to stamp out from the cheek-plate, as shown at 6. As shown clearly in Fig. 1, this stop lies directly in the path of movement of the associated eye D, as it is moved upward around the axis of the shank C, and consequently complete rotation of said shank is impossible. When the animal stops tossing its head, the eyes D, rings E, snap-hooks 5, and driving-lines or ropes 2, will drop back to normal position.

It will be very evident from what has been set out that when the driving-lines or ropes become twisted, the driver must stop his animals, unsnap the hooks 5, and after straightening the said driving-lines or ropes, snap the hooks 5, back again on the rings E. Maintaining the said driving-lines or ropes in normal driving position makes for safety in handling the work animals, as well as economizes in time.

While I preferably locate the eyes D, in respect of the axis of the shank C, as stated, it must be understood that I do not confine myself to this specific construction.

The upper ends of the cheek-plates B, are bent or formed outwardly, thus the bars G, are located well away from the cheeks of the animal and hence the lower ends of the bridle-straps X, are held out of contact with the said cheeks; this makes for comfort.

What I claim as my invention is:

A horse bit comprising the combination of a tubular member adapted to lie within the mouth of a draft animal; a cheek-plate fixedly attached to each end of said member, the upper end of each plate being formed to extend outwardly away from contact with the animal's cheeks when in use, and each provided with an aperture at its top portion to permit a bridle-strap to be attached thereto; a shank mounted within said member with its ends projecting beyond the ends thereof and through said cheek-plates, each end of said shank being provided with an eye, the said eyes being in alignment and lying beyond the same side of said shank, the said shank intermediate said cheek-plates and said rings being formed into segments of greater radii than the radii of said eyes; a ring movably mounted in each of said eyes to which the driving-lines or ropes are to be attached, and a stop stamped from one of said cheek-plates with which the adjacent eye contacts to limit the axial movement of said shank, for the purpose specified.

JOHN HENRY HAUSER.